Figure 1:
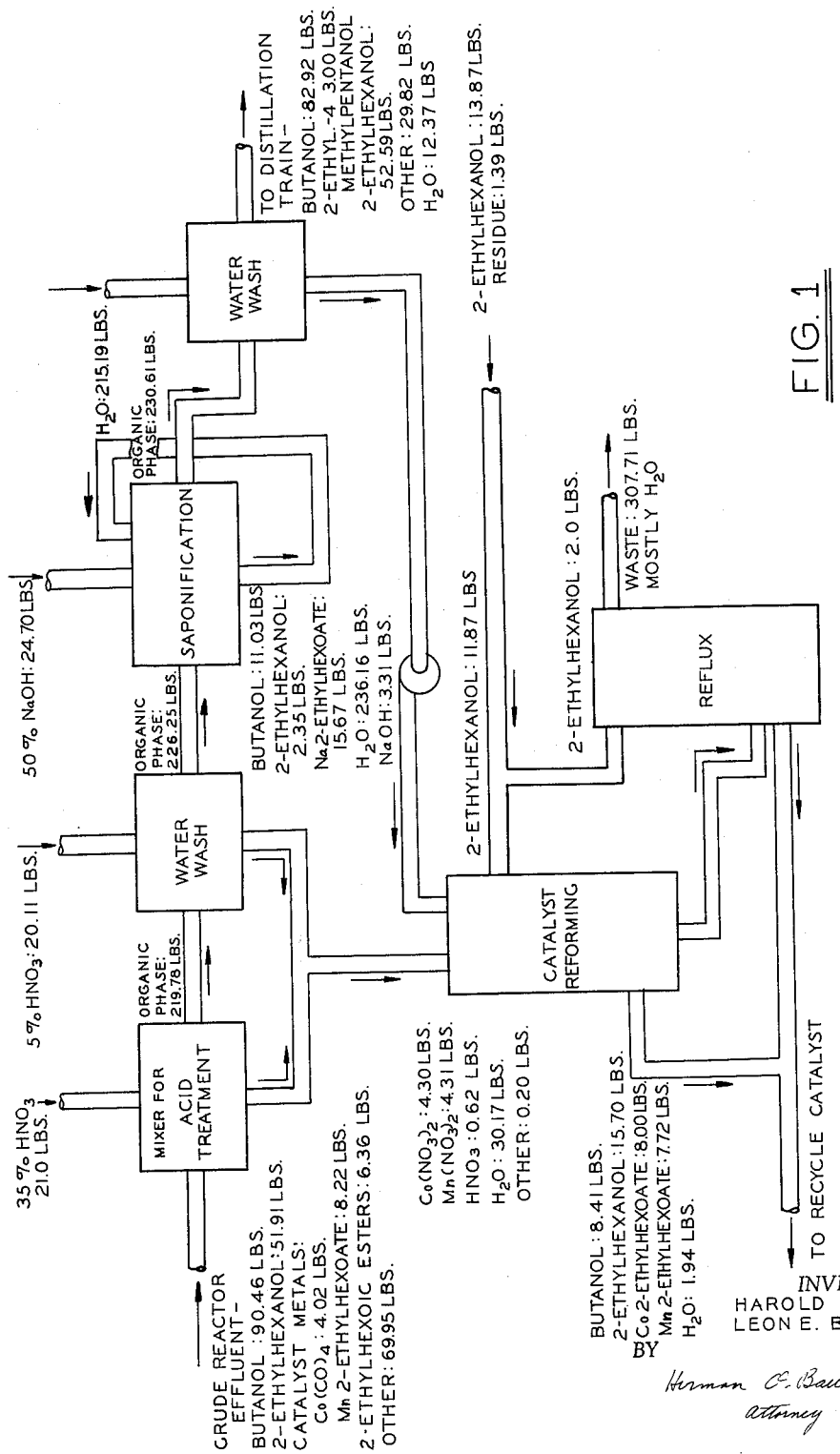

Feb. 8, 1966  H. R. NULL ETAL  3,234,146
RECOVERY AND REGENERATION OF OXO PROCESS CATALYSTS
Filed Jan. 18, 1963  4 Sheets-Sheet 1

INVENTORS
HAROLD R. NULL
LEON E. BOWE
BY Herman C. Bauermeister
attorney

United States Patent Office 3,234,146
Patented Feb. 8, 1966

3,234,146
RECOVERY AND REGENERATION OF OXO
PROCESS CATALYSTS
Harold R. Null, Florissant, and Leon E. Bowe, Glendale, Mo., assignors to Monsanto Company, a corporation of Delaware
Filed Jan. 18, 1963, Ser. No. 252,500
8 Claims. (Cl. 252—413)

The present invention relates to an improvement in the oxo process, specifically with respect to the recovery of the catalyst which is employed, as well as the regeneration of the catalyst for recycling. It is an object of the invention to provide a method for the recovery of the catalytic components, particularly for the purpose of employing such components in further catalytic reactions such as condensation or for the recycling of such components in the basic oxo process.

It is known in the art that the carbonylation of olefinic compounds with carbon monoxide and hydrogen, catalyzed by cobalt involves the formation of a cobalt carbonyl. It has been recognized that the essential catalytic element in the carbonylation reaction is cobalt carbonyl or cobalt hydrocarbonyl regardless of the initial source of the cobalt. The further conduct of the reaction in the addition of carbon monoxide and hydrogen to an olefin, such as propylene, then results in the formation of oxygen-containing organic compounds, specifically aldehydes, such as n-butyraldehyde and isobutyraldehyde. It is sometimes desired to obtain higher-molecular-weight compounds such as eight-carbon atom aldols by condensation of the said four-carbon aldehydes. It is desirable to employ the same catalyst for the preliminary carbonylation as well as the second step of condensation as described above. However, it has heretofore been found that the metal carbonyls which catalyze the carbonylation reaction are impractical or ineffective for the catalysis of the condensation reaction. In addition, carbonyls are poisons with respect to hydrogenating catalysts, such as Raney nickel. This factor becomes important since hydrogenation follows condensation in the processing of the products of the present invention.

The catalyst contemplated by the present invention is based upon a combination of two components. The first component is an oxide, hydroxide, salt or carbonyl of cobalt. Inorganic salts such as the nitrate, carbonate, chloride, or sulfate may be employed. However, it is preferred that the said salt be a salt of an organic acid, still more preferably having from 4 to 20 carbon atoms. Examples of the acid moiety in combination with the said metals include the stearate, alpha-ethylcaproate, also known as 2-ethylhexoate, dodecanoate, naphthenate, tallate (acids from tall oil), phthalate, benzoate, maleate, adipate and the like. The term salt as used herein also includes other organic compounds such as cobalt acetylacetonate.

The second component of the combination catalyst is an organic manganese salt. It is preferred that the said salt be a carboxylate which is soluble in the aldehyde product resulting from the oxonation. Preferred examples of such manganese carboxylates include the stearate, alpha-ethylcaproate, dodecanoate, naphthenate, tallate and the like.

The combination catalyst may be dissolved or dispersed in the reaction product or in a solvent such as benzene or other hydrocarbons, or ethers such as diethyl ether. The present reaction may also be conducted in the presence of free organic acids, set forth above, which may be present in a concentration of 0.01% to 10% by weight, relative to the said salts described above.

The oxo process of the present invention involving a combination method for conducting an oxonation reaction together and concomitantly with a condensation reaction using a cobalt-manganese catalyst may be carried out in a number of ways. The simplest method of operation is to employ a batch type of reactor to which the desired proportions of olefin, carbon monoxide and hydrogen are charged together with the aforesaid combination catalyst. The entire charge in this method is placed in an autoclave or other type of batch vessel. The charge is then heated to the desired temperature for oxonation followed by cooling or continued processing such as at a somewhat higher temperature in order to complete the condensation of the specific aldehydes with the production of a dehydrated aldol. The dehydrated aldols produced by the above methods may be used as intermediates in various processes, but are more commonly hydrogenated to obtain alcohols useful as solvents or plasticizer intermediates.

The present catalyst recovery process provides a means for the substantially complete recovery of the cobalt and manganese values which are present in the catalyst either at the conclusion of the condensation and hydrogenation steps, or if desired, the process may be applied directly after the primary carbonylation reaction in which the olefins are transformed to aldehydes. In the latter circumstance in which the catalyst exists substantially completely as cobalt carbonyl and (manganese carbonyl when the managanese is employed together with a cobalt), a partial recovery of the metal values may be accomplished by merely releasing the pressure upon the system whereupon some of the metal carbonyls are decomposed with the evolution of carbon monoxide and the deposition of the metal e.g., the cobalt and manganese. The remaining liquid is then passed directly to the present recovery process.

The recovery system is also applicable to the modification of the oxo process in which the same metal values pass through the entire reaction stream of carbonylation, condensation and hydrogenation. Essentially the present process comprises an acid decomposition of the metal salt and carbonyl components followed by selective extraction of the anionic and cationic components.

The unitary oxo process in which a combination catalyst such as the cobalt and manganese components is used for the combination reactions of carbonylation, condensation and hydrogenation is generally conducted by charging the original catalytic metal components as organic salts such as cobalt 2-ethylhexoate, manganese 2-ethylhexoate, or the corresponding stearates or tallates (the organic acids found in tall oil). An excess of the organic acid, such as from 0.01% to 10% over the stoichiometric, may also be charged with the initial catalytic components, or may be added to the final spent catalyst stream or even the complete oxo reactor effluent in order to have present the organic acid anions for the recovery of the cationic metal components (including metals present as carbonyls). Thus, the present recovery process in segregating the metal components by acid extraction, followed by saponification with an alkaline material, including caustic substances such as sodium hydroxide, potassium hydroxide as well as alkaline earth compounds of the alkali and alkaline earth elements, permits the recovery also of the anionic or acid radicals e.g., the 2-ethylhexoate, stearate and tallate radicals as discussed above, as corresponding to the originally charging organic metal salts. For example, potassium 2-ethylhexoate is the intermediate product when employing potassium hydroxide added to the stream containing 2-ethylhexoate esters or other combined and free forms of the 2-ethylhexoate esters or other combined and free forms of the 2-ethylhexoate radicals.

The present recovery process embraces the following essential steps. The mineral acid is used to contact the catalytic source such as a metal concentrate in liquid, slurry or solid form. The source may also be the crude product of the oxonation reactor, either after the carbonylation steps or after the condensation or hydrogenation steps. Such mineral acid contacting, for example, may employ sulfuric, phosphoric, nitric or hydrochloric acids of from 1% to 75% acid strength and with from 100% to 200% of the stoichiometric proportion of acid relative to the metal to be recovered.

The above step of acid contacting may be carried out at room temperature or at moderate temperatures e.g., up to 150° at which the organic products are available from the oxo process. In the step which consists of treating the crude oxo effluent, or a catalyst concentrate available from other recovery systems, with a mineral acid, the temperature can range from 20° C. to 150° C., and any contact time above one minute. These ranges are also applicable to the optional washing step which follows the acid contacting.

After the mineral acid contacting there is a phase separation of the aqueous or acid layer containing the metal salts, e.g., cobalt sulfate and manganese sulfate when employing sulfuric acid. The supernatant organic phase contains the organic acid corresponding to the original metal salts e.g., the stearic or 2-ethylhexoic acid as well as any excess organic acid which may have been introduced or formed during the course of the process.

This organic phase may optionally be washed with water or weak acid to complete the removal of metal components as the sulfate or other acid salt. Such washings are combined with the aqueous phase from the first step.

The first stage of the recovery system e.g., the acid contacting of the crude catalyst source is conducted in any suitable, acid resistant material such as an autoclave or mixing vessel. Mixing means are generally desirable in order to promote rapid contacting of the acid, for example 35% nitric acid, and the catalyst either in solid, slurry or liquid form.

The organic phase after the acid treatment is subjected to saponification conditions such as with a 50% solution of sodium hydroxide, although solutions of from 10% to 60% of NaOH or KOH may be employed. The caustic is most conveniently used at from 10% to 150% by weight relative to the organic phase. After the completion of the saponification step, a phase separation is again employed to remove the aqueous excess caustic from the supernatant organic phase. The organic phase is then separated from the caustic, although this step may be combined with water washing such as in a countercurrent extractor or scrubber wherein the organic phase consisting of the alcohols and the dehydrated aldols of the original aldehydes are washed free of the alkali salts such as the sodium salts resulting from saponification with sodium hydroxide. The aqueous extracts are then employed in further steps of the present process while the organic phase is subjected to refining operations such as distillation.

Saponification can be satisfactorily effected at a temperature between 70° C. and 100° C., or preferably from 90° C. to 100° C. A contact time preferably greater than 10 minutes such as from 10 to 30 minutes is used. When a water wash of the organic product is used, the temperature of such step is not critical although a desirable range is from 40° C. to 100° C. The catalyst reforming step conducted with alcohol of from 2 to 20 carbon atoms as the extraction medium depends for its critical conditions upon the degree of agitation and contacting which is employed such as in a countercurrent tower operation or agitation in one zone followed by phase separation in another zone in the regeneration is accordingly effective which the broad range of from 0° C. to 100° C. and a contact time of greater than 5 minutes. Because of the presence of acid at this stage, the pH should desirably be maintained in the range of from 7 to 9 in the catalyst reformation stage.

The aqueous stream from saponification, containing the sodium salts of the organic acids, and the aqueous solution of nitrates from the mineral acid decobalting are then preferably contacted in the presence of a heavy alcohol, e.g., an alcohol of from 6 to 20 carbon atoms such as the alcohol product in the oxo process 2-ethylhexanol or dodecanol. In this step the cobalt and manganese content are reconverted to the salt of the organic acid while the sodium or potassium is removed as the original salt e.g., sodium sulfate, sodium nitrate, etc. While not essential, it is preferable to maintain the pH during such contacting in the range of from 7 to 9 since it has been found that such pH control reduces the amount of cobalt and manganese salts of the organic acid which remain in colloidal suspension in the aqueous phase, containing dissolved therein the waste inorganic salts.

If desired the alcohol extraction may be conducted in two or more stages with the secondary contacting occurring at higher temperatures such as at the reflux temperature of the mixture in order to complete the extraction of the organic metal salts for recovery of the catalytic components, and in order to provide a recycle catalyst where desired.

The following examples illustrate specific embodiments of the present invention.

EXAMPLE 1

The catalyst recovery system is applied to an oxo unit charging propylene as the olefin. The reactor is operated to obtain condensation and hydrogenation with the cobalt-manganese catalyst, so that the product distribution as shown in FIGURE 1 is predominantly n-butanol and 2-ethylhexanol. The crude product flows at the rate of 230.9 lbs. from the oxonation reactor to the present purification system. This stream consists primarily of alcohols with minor proportions of organic impurities such as esters, and contains the catalyst metals, cobalt and manganese, as compounds in solution or slurry form; the stream is introduced into a vessel where it is contacted with 20.1 lbs. of 35 wt. percent nitric acid. By means of agitation for about 10 minutes at a temperature of about 50° C., the metal compounds react to give water soluble nitrates.

The mixture is then separated into two phases; the organic phase is pumped to another vessel where it is washed for 10 minutes at about the same temperature of 50° C. with water or weak nitric acid (on the order of 5% by weight). With this step, the remaining metal nitrates are removed with the aqueous phase and combined with the aqueous phase from the first acid treatment. The organic phase is then fed to a well-stirred saponification reactor where it is contacted with 50% (wt.) aqueous sodium hydroxide at atmospheric reflux (approximately 104° C.) for one hour. This treatment of the organic phase converts all esters to the alcohol and sodium salt of the acid. The aqueous phase containing 30% caustic is in large part recycled back to the saponification for re-use.

The organic phase from saponification is cooled to 60° C. and is then fed to a countercurrent extractor where it is washed free of the sodium salts with water. Then the organic effluent goes to a distillation train where it is further refined as product alcohol.

The aqueous stream containing the sodium salts and the previously described aqueous stream containing the metal nitrates are mixed and contacted in the presence of 2-ethylhexanol as a representative heavy alcohol. With agitation, and pH control between 7 and 9, (this may be regulated by the addition of a small amount of nitric acid). The cobalt and manganese are converted to the salt of the organic acid with residence time of about 30 minutes, and the sodium content becomes sodium nitrate which remains in solution due to its high solubility in water. Most of the cobalt and manganese content are removed as the organic salts, e.g., cobalt and manganese 2-ethylhexoate, in the alcohol solution and are ready for recycle. However, in certain cases, some of the cobalt and manganese salts of the organic acid remain in colloidal suspension in the aqueous phase and are then fed to a vessel where the aqueous phase is refluxed in the presence of a heavy alcohol such as 2-ethylhexanol. Under these conditions the colloidal suspension is coagulated, and the cobalt and manganese salts dissolve in the heavy alcohol in which it is recycled back to the reactor. Ten minutes residence time and violent boiling is sufficient to coagulate the colloid. The aqueous phase may be discarded or treated further for recovery of dissolved organic materials. With this process 99% of the catalyst metals are recovered.

EXAMPLE 2

Figure 2:
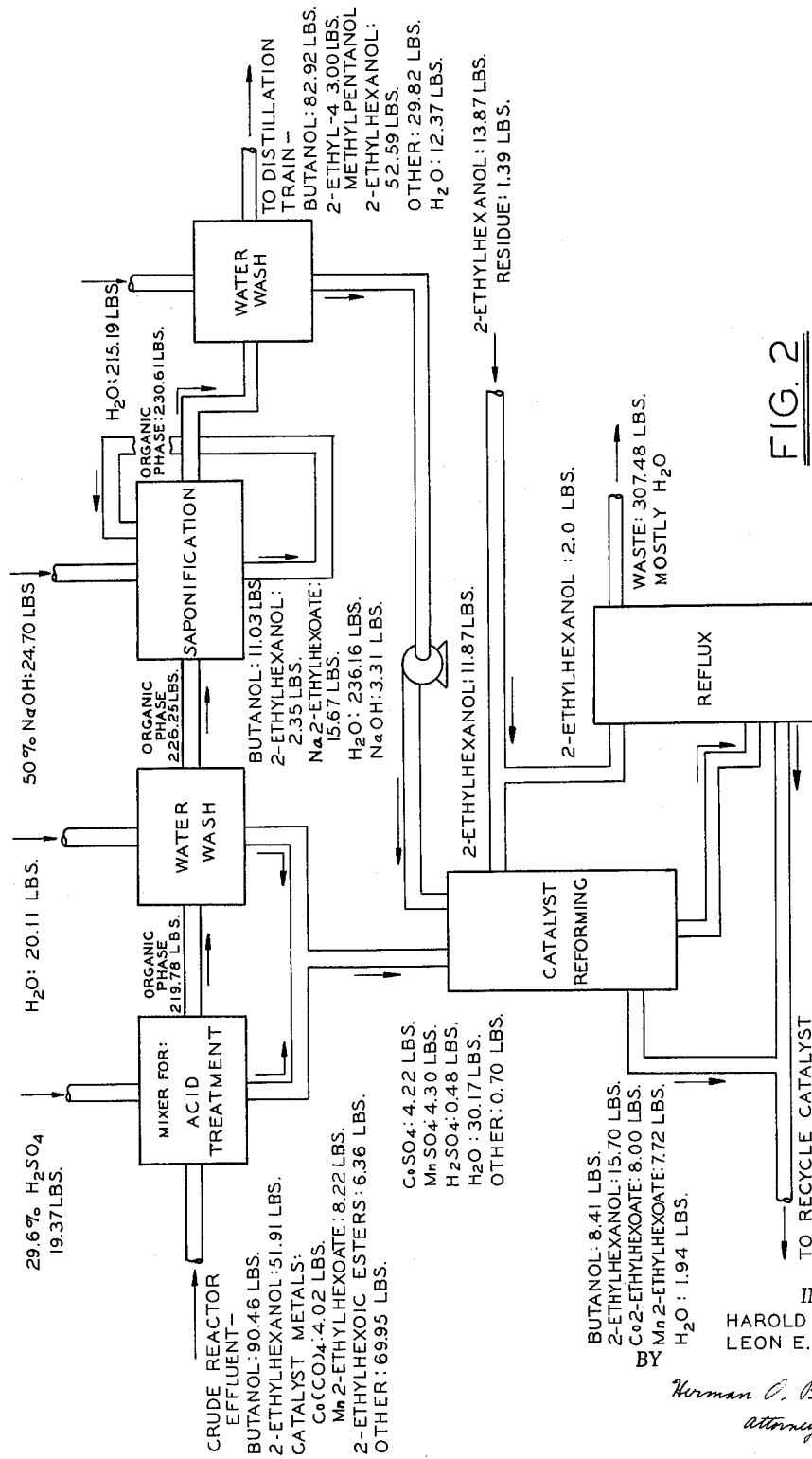

The procedure employed here is identical to the preceding example except that a different mineral acid is employed, as shown in FIGURE 2. Sulfuric acid is used here in the proportion of about 19.37 lbs. of sulfuric acid of 29.6 (wt. percent) strength, relative to 230.9 lbs. of crude organic alcohols. The final aqueous effluent has a pH between 7 and 9. With this process approximately 99% of the catalyst metals are recovered.

EXAMPLE 3

Figure 3:
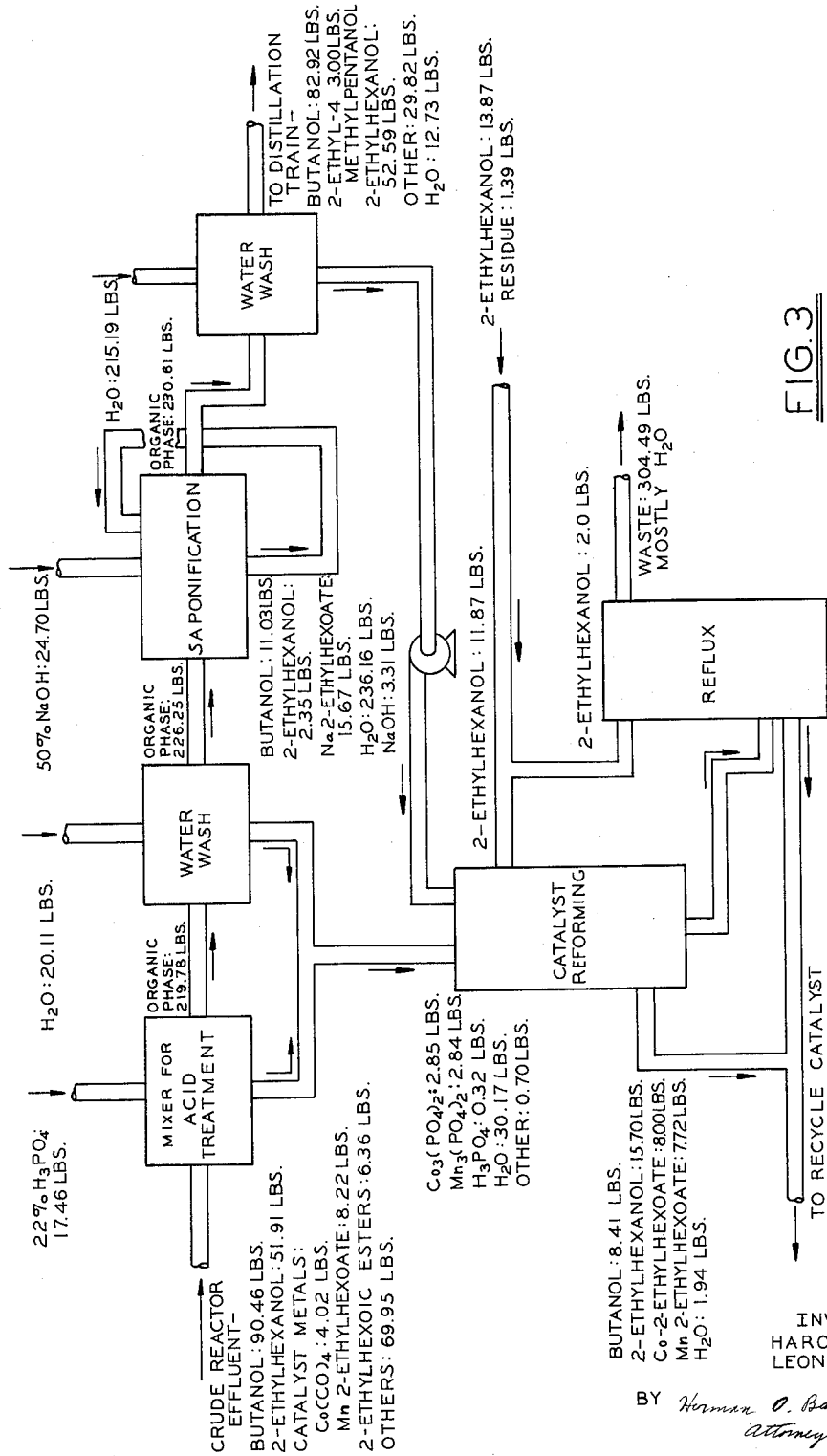

The procedure employed here is identical to that described in Example 1 with the replacement of nitric acid by a different mineral acid as shown in FIGURE 3. Phosphoric acid is used here in the proportion of about 17.46 lbs. of phosphoric acid of 22% (wt.) strength, relative to 230.9 lbs. of crude organic alcohols. The final aqueous effluent has a pH between 7 and 9. With this process approximately 99% of the catalyst metals are recovered.

EXAMPLE 4

Figure 4:
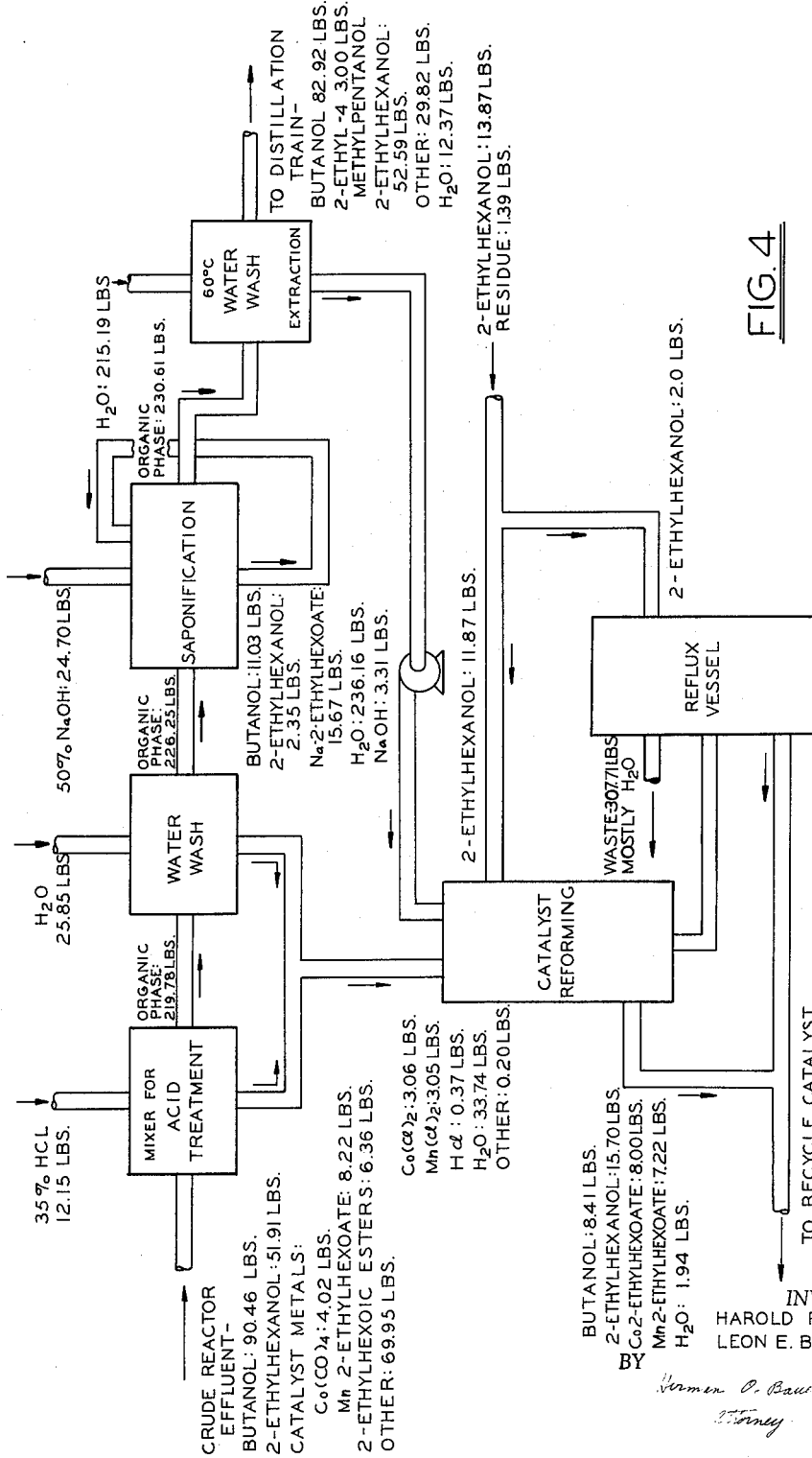

The procedure employed here is identical to that described in Example 1 with the replacement of nitric acid by a different mineral acid as shown in FIGURE 4. Hydrochloric acid is used here in the proportion of about 12.15 lbs. of hydrochloric acid of 35% weight strength, relative to the 230.9 lbs. of crude organic alcohols. The final aqueous effluent has a pH between 7 and 9. With this process approximately 99% of the catalyst metals are recovered.

The drawings of the present invention illustrate specific embodiments of the use of various acids in carrying out the process of the present invention. In the drawings, FIGURE 1 shows the use of nitric acid, FIGURE 2 shows the use of sulfuric acid, FIGURE 3 shows the use of phosphoric acid, while FIGURE 4 shows the use of hydrochloric acid.

The previously described examples are illustrations of a few of the many modifications and variations of the invention as hereinbefore set forth. Other variations may be made without departing from the spirit and scope of the invention.

In the step which consists of treating the crude oxo effluent with a mineral acid the temperature can range from 20–150° C. and any contact time above 1 minute. These ranges are also applicable to the optimal work step which follows immediately after the acid contact.

Saponification can be satisfactorily effected at a temperature between 70–100° C. with any contact time of a length greater than 10 minutes being used. The temperature of the extraction which follows the saponification can also be adjusted with the most desirable limits being from 40–100° C.

The catalyst reforming step also has regulative variable of temperature and time. This regeneration can best be effected with the use of 0°–100° C. as the allowable temperature range and a contact time of greater than 5 minutes. Critically, the pH must be maintained in the range of from 7 to 9 at this point.

Other modifications will be apparent to those skilled in the art; therefore, only such limitations should be imposed as are indicated in the appended claims.

What is claimed is:

1. Process for the recovery of catalytic metal components as organic metal salts in an oxo process, which comprises contacting a mixture of organic compounds having present in at least partially soluble form therein, catalytic metal components existing as compounds, and organic acid radicals in combined form, which comprises contacting the said mixture with an aqueous mineral acid to extract catalytic metal salts corresponding to the said mineral acid, separating the said metal salts in aqueous solution from the organic components of the aforesaid mixture, thereafter treating the said organic compounds containing the aforesaid organic acid radicals in combined form, with an alkaline compound selected from the group consisting of alkali and alkaline earth metal hydroxides to form the alkaline organic salts corresponding to the organic acid radicals present, extracting the said alkaline organic salts from the said organic compounds, and thereafter reacting the aforesaid mineral acid salts containing the catalytic metal salts with the extract containing the alkaline organic salts to form organic salts of the said catalytic metals, and contacting the said organic salts with an alcohol having from 2 to 20 carbon atoms, and separating from the said solution an alcohol extract containing the recovered catalytic metals as organic salts.

2. Process for the recovery of catalytic metal components as organic metal salts in an oxo process, which comprises contacting a mixture of alcohols having present in at least partially soluble form therein, catalytic metal components existing at least in part as carbonyl and carbonylate as compounds, together with organic acid radicals in combined form, which comprises contacting the said mixture with an aqueous mineral acid to extract catalytic metal salts corresponding to the said mineral acid, separating the said metal salts in aqueous solution from the alcohol components of the aforesaid mixture, thereafter treating the said alcohols containing the aforesaid organic acid radicals in combined form, with an alkaline compound selected from the group consisting of alkali and alkaline earth metal hydroxides to form the alkaline organic salts corresponding to the organic acid radicals present, extracting the said alkaline organic salts from the said organic compounds, and thereafter reacting the aforesaid mineral acid salts containing the catalytic metal salts with the extract containing the alkaline organic salts to form organic salts of the said catalytic metals, and contacting the said organic salts with an alcohol having from 2 to 20 carbon atoms, and separating from the said solution containing the said solution an alcohol extract containing the recovered catalytic metals as organic salts.

3. Process for the recovery of catalytic metal components in an oxo process in which at least one member of the class consisting of cobalt and manganese organic acid salts having from 2 to 20 carbon atoms are contacted with an olefin having from 2 to 20 carbon atoms in the presence of carbon monoxide and hydrogen, and in which the oxo reactor products contain dissolved catalytic metal components and combined forms of organic acid radicals, the improvement which comprises contacting the said organic oxo products with an aqueous mineral acid to form metal salts corresponding to the said mineral acid, separating the said metal salts in aqueous solution from the organic phase of the said oxo products, thereafter treating the said organic oxo products with an aqueous solution of an alkaline compound selected from the group consisting of alkali and alkaline earth metal hydroxides to form a solution of the alkaline organic salts corresponding to the organic acid radicals, separating the said alkaline salt from the said organic oxo products, and thereafter combining the aforesaid aqueous solution of mineral acid salts containing the catalytic metal salts, with the aqueous solution containing the alkaline organic salts at a pH of between 7 and 9 for the resultant aqueous mixture, and contacting said combined solutions with a heavy alcohol having from 2 to 20 carbon atoms, and separating from the said mixture an alcohol extract containing the recovered catalytic metals as organic salts.

4. The process of claim 1 wherein said mineral acid is nitric acid.

5. The process of claim 1 wherein said mineral acid is sulfuric acid.

6. The process of claim 1 wherein said mineral acid is phosphoric acid.

7. The process of claim 1 wherein said mineral acid is hydrochloric acid.

8. In a process for the recovery of cobalt and manganese catalytic components in an oxo process in which at least one member of the class consisting of cobalt and manganese organic acid salts having from 2 to 20 carbon atoms are contacted with an olefin having from 2 to 20 carbon atoms in the presence of carbon monoxide and hydrogen and in which the oxo reactor products contain dissolved cobalt and manganese catalytic components and organic acid radicals, the improvement which comprises contacting the said acid oxo reactor products with aqueous nitric acid to extract metal nitrate salts, separating the said metal nitrate salts in aqueous solution from the organic phase of the said oxo reactor products, thereafter treating the said organic reactor products with aqueous sodium hydroxide to form a solution of the sodium organic salts corresponding to the organic acid radicals present, extracting the said sodium organic salt from the said organic reactor effluent, and thereafter combining the aforesaid cobalt and manganese nitrate salts with the aqueous solution containing the sodium organic salts, and contacting said combined components with 2-ethylhexanol, and separating from the said mixture a 2-ethylhexanol extract containing the recovered cobalt and manganese catalytic metals as organic salts.

References Cited by the Examiner

UNITED STATES PATENTS 2,638,487   5/1953   Russum et al. _____ 260—604

FOREIGN PATENTS 731,389   6/1955   Great Britain.
1,089,983   10/1954   France.

TOBIAS E. LEVOW, *Primary Examiner.*

SAMUEL H. BLECH, *Examiner.*